United States Patent [19]

Moebius

[11] 4,061,367

[45] Dec. 6, 1977

[54] LOCKRING TUBE JOINT

[76] Inventor: Kurt O. Moebius, P.O. Box 2339, Palos Verdes Peninsula, Calif. 90274

[21] Appl. No.: 612,932

[22] Filed: Sept. 12, 1975

Related U.S. Application Data

[63] Continuation-in-part of Ser. No. 500,604, Aug. 26, 1974, abandoned, which is a continuation-in-part of Ser. No. 331,319, Feb. 9, 1973, Pat. No. 3,893,720.

[51] Int. Cl.² ............................................. F16L 13/14
[52] U.S. Cl. .................................. 285/382.2; 29/508; 29/520; 285/417; 403/281; 403/285
[58] Field of Search ................. 285/382.2, 382.1, 382, 285/255, 256, 242, 417, 173, 329, 187, DIG. 6, 382.7; 403/281, 285, 284; 29/520, 508

[56] References Cited

U.S. PATENT DOCUMENTS

| | | | |
|---|---|---|---|
| 3,149,860 | 9/1964 | Hallesy | 285/382 X |
| 3,375,026 | 3/1968 | Szohatzky | 285/382.2 X |
| 3,378,282 | 4/1968 | Demler | 285/382 X |
| 3,498,648 | 3/1970 | Hallesy | 285/382.2 X |
| 3,501,178 | 3/1970 | Watts | 285/382.2 X |
| 3,528,689 | 9/1970 | Roe | 285/382.2 |
| 3,572,779 | 3/1971 | Dawson | 285/382.2 |
| 3,674,292 | 7/1972 | Demler | 285/382 X |
| 3,765,708 | 10/1973 | Pease et al. | 285/382.2 |
| 3,827,727 | 8/1974 | Moebius | 285/382.2 X |

FOREIGN PATENT DOCUMENTS

| | | | |
|---|---|---|---|
| 524,816 | 4/1955 | Italy | 285/255 |

*Primary Examiner*—Thomas F. Callaghan
*Attorney, Agent, or Firm*—Lyon & Lyon

[57] ABSTRACT

A lockring tube joint, including an inner and an outer axially overlapping tube member, and a lockring having internally an initial cone frustum zone joined at its smaller end to a cylindrical zone, and a subsequent cone frustum zone joined at its larger end to the cylindrical zone; the tube members being dimensioned to undergo corresponding radial compression in the regions of the cone frustum zones upon assembly of the lockring thereon. Other embodiments of the lockring being provided with additional cone frustum zones and cylindrical zones, and other embodiments of the tube members having localized ribs to provide corresponding localized constriction for increased bonding and sealing engagement between the tube members.

12 Claims, 20 Drawing Figures

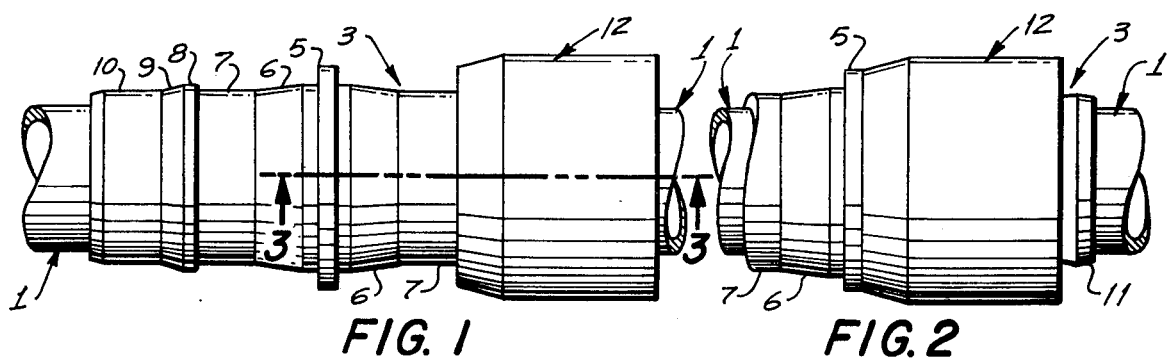
FIG. 1
FIG. 2
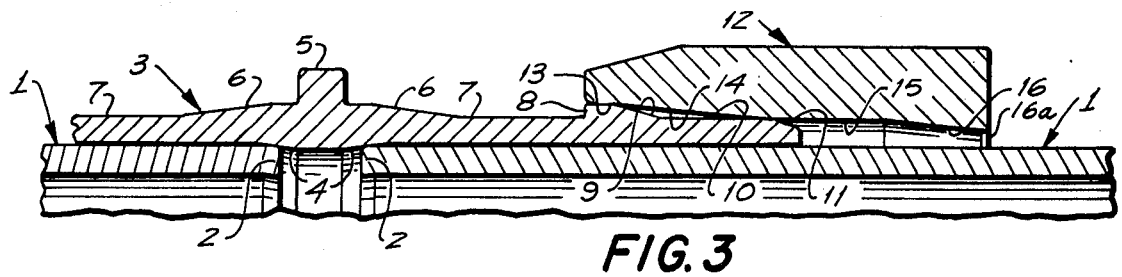
FIG. 3
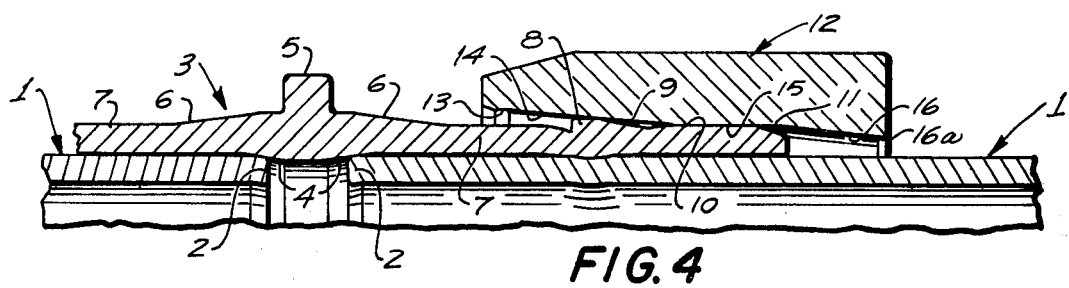
FIG. 4
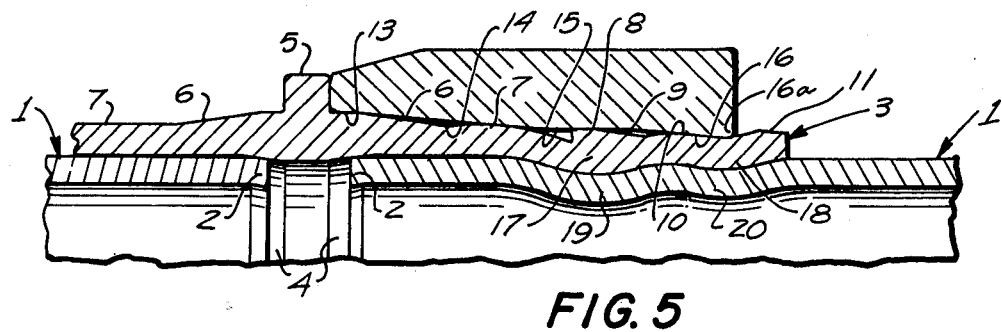
FIG. 5

LOCKRING TUBE JOINT

This application is a continuation-in-part of application Ser. No. 500,604, filed Aug. 26, 1974, entitled CONSTRICTOR RING JOINT, and now abandoned which is in turn a continuation-in-part of application Ser. No. 331,319 filed Feb. 9, 1973, entitled CONSTRACTOR RING JOINT and now U.S. Pat. No. 3,893,720.

BACKGROUND

The present invention is related to the lockring tube joint disclosed in U.S. Pat. No. 3,827,727 and is intended to extend the range of use of lockring tube joints.

SUMMARY

The present invention is directed to a tube joint having axially overlapping tube members secured by a lockring, and is summarized in the following objects:

First, to provide a lockring tube joint, which utilizes a novelly arranged lockring having an entrance cone frustum zone intended primarily to press the tube members into intimate mutual contact, a cylindrical zone maintaining such contact, followed by a second cone frustum zone to effect radial constriction of the tube members to provide high load concentration, and finally a zone in which the tube members clear the lockring to permit spring back of the tube members;

Second, to privide a lockring tube joint wherein the lockring is provided with a set of three cone frustum zones and alternate cylindrical zones to provide a plurality of spaced regions in which the tube members are radially compressed.

Third, to provide a lockring tube joint wherein either of the tube members may be provided with ribs at selected locations to provide localized regions of increased radial compression for increased bonding and sealing engagement between the tube members.

Fourth, to provide a lockring tube joint, as indicated in the preceding object, wherein selected ribs may be interrupted by axial channels whereby on radial compression torsional interlock between the tube members is attained.

Fifth, to provide a lockring tube joint which is particularly adapted for the connection of tube members having relative thin walls with respect to their diameters, as well as for tubes having relatively low strength material, but is not limited thereto.

Sixth, to provide a lockring tube joint wherein either tube member may be in the form of a connector collar of stronger material than the other tube member and provided with ribs capable of being forced into the wall of the other tube member for interlocking and sealing connection therewith.

Seventh, to provide a lockring tube joint which may utilize as a part thereof a feature of the aforementioned patent namely an abrupt terminal shoulder on the lockring permitting springback of the tube members to effect additional interlock between the lockring and tube member.

Eighth, to provide a lockring secured joint in which the inner member may be a solid shaft.

DESCRIPTION OF THE DRAWINGS

FIG. 1 is a side view of one embodiment of the lockring tube joint, indicating fragmentarily a pair of inner tube members coupled by an outer tube member and showing a lockring in its initial position.

FIG. 2 is a fragmentary side view thereof showing one of the lockrings in its final position.

FIG. 3 is an enlarged longitudinal fragmentary sectional view thereof taken through 3—3 of FIG. 1 showing a lockring in its initial position.

FIG. 4 is an enlarged longitudinal fragmentary sectional view corresponding to FIG. 3 showing the lockring in an intermediate position.

FIG. 5 is an enlarged fragmentary sectional view also corresponding to FIG. 3 showing the lockring in its final position.

Referring to FIGS. 1 through 5, the construction here illustrated is particularly suited to provide a high strength connection between a pair of tubes and a surrounding collar. The lockring tube joint includes a pair of inner tubes 1 having confronting end regions 2. The adjacent portions of the inner tubes are received in an outer tube or collar 3 which includes a pair of opposed internal tapered sealing and seating regions 4 which are elastically engaged by the end regions 2. Otherwise, the interior of the outer tube is cylindrical.

Figure 6:
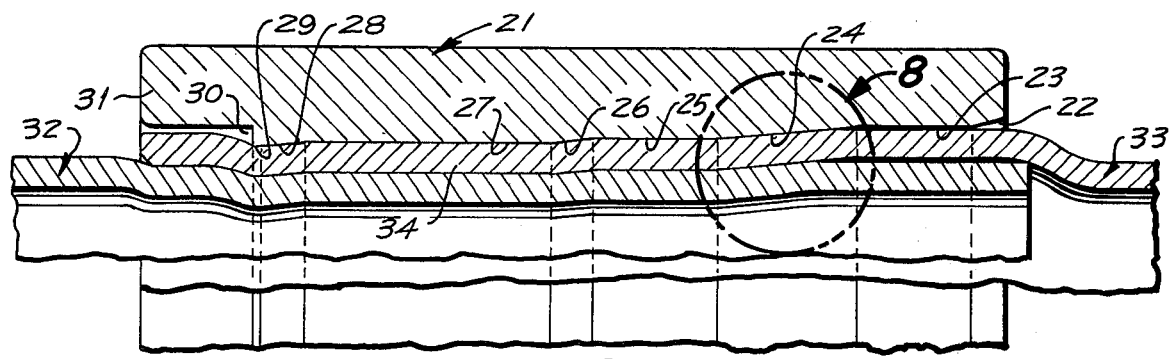
FIG. 6 is an enlarged fragmentary sectional view showing another embodiment of the lockring tube joint showing a pair of tube members, one having a bell end, and showing the lockring in its final position after being forced over the bell end from the open extremity thereof.

The collar is provided with a centrally located external stop flange 5. Adjacent opposite sides of the stop flange, the collar is provided with external tapered regions 6. Continuing from each region 6, the collar includes a first external cylindrical region 7 terminating at an external constrictor flange 8, the far side of which is tapered as indicated by 9. Continuing from the tapered side 9, is a second externally cylindrical portion 10. Each extremity of the collar is externally beveled as indicated by 11.

Each side of the collar 3 receives a lockring 12 having a short cylindrical entrance end 13, the extremity of which may be beveled. Continuing axially inward from the entrance end 13, the lockring includes an initial internally tapered or cone frustum region 14 which joins to an internal cylindrical region 15. The region 15 joins to a final internally tapered or cone frustum region 16 terminating at an abrupt shoulder 16a.

The embodiment of the lockring tube joint as shown in FIGS. 1 through 5 is assembled as follows:

During pre-assembly a prelubricated pair of lockrings is positioned so that their entrance ends 13 overlie the flanges 8 as shown in FIG. 3. Next, the pair of tubes 1 is inserted in the collar, keeping a light end force on the tubes. Finally opposed axial forces are applied simultaneously to both lockrings to force the lockrings onto the collar 3. Initially, the final tapered regions 16 of the lockrings are spaced from the collar so that the axial force applied to each constrictor ring is first converted to a constriction force applied to the corresponding flanges 8.

It is desirable that the dimensions of the collar and the selection of the metal comprising the collar, be such that some axial buckling of the collar between the flanges 8 and the stop flange 5 may occur to the extent that a stronger elastic seating and sealing connection is formed between the end regions 2 and the tapered sealing regions 4.

Continued movement of the lockrings causes the final tapered regions 16 to compress the external regions 10 of the collar while the cylindrical region 15 moves over the flange 8 without exerting a further constricting force thereon. When the lockrings 12 are in their final position abutting the stop flange 5, the outer tube forms a pair of first constricted regions 17 and second constricted regions 18 and each inner tube forms a corresponding main or first constricted region 19 and a second constricted region 20 as shown in FIG. 5. Between the constricted regions the outer and inner tubes undergo some elastic recovery; and, in particular, elastic recovery of the tubes occurs immediately beyond the shoulder 16a of the lockring. The sharp edge of the flange 8 aids in keeping the lockring in place. Also elastic recovery of the outer tube 3 locks the lockring in its final position.

It should be noted that by providing the cylindrical regions 10 and 15 which may be dimensioned to provide a sliding fit the force required to constrict the flange 8 and to constrict the region 10 do not occur simultaneously but occur in sequence.

Stated otherwise, while the collar 3 may be designed to permit some buckling, the force required to constrict the flange 8 is a localized force exerted by the tapered region 14 while the cylindrical portion 15 slides over the cylindrical region 10. Then, during constriction of the region 10, the force required is confined to the localized force exerted by the tapered region 16 plus a moderate frictional force between the flange 8 and the cylindrical portion 15.

Figures 7, 8, 11:
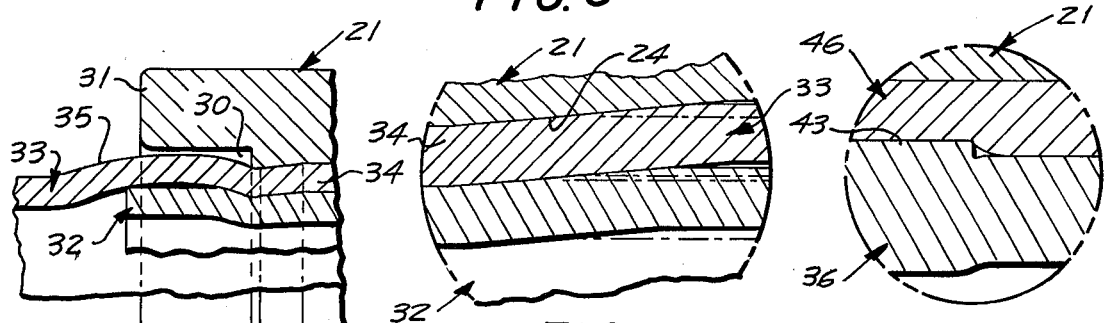
FIG. 7 is an enlarged fragmentary sectional view corresponding to FIG. 6, but showing the lockring in its final position after being forced over the flared extremity of the bell end from the closed extremity thereof.
FIG. 8 is a further enlarged fragmentary sectional view taken within circle 8 of FIG. 6.
FIG. 11 is a further enlarged fragmentary sectional view taken within circle 11 of FIG. 10.

Referring to FIGS. 6 through 11, the lockring 21 here illustrated is shown in conjunction with various embodiments of tube members. The lockring is provided internally with a series of alternate tapered or cone frustum zones and cylindrical zones; more particularly, the lockring includes a beveled leading end 22, followed consecutively by a cylindrical zone 23, a first tapered cone frustum zone 24, a second cylindrical zone 25, a second tapered or cone frustum zone 26, a third cylindrical zone 27, a third tapered or cone frustum zone 28, and finally a rudimentary cylindrical zone 29, the lockring terminating in an abrupt shoulder 30. In some cases to increase the strength of the lockring in the region of the shoulder 30, the lockring may be provided with an extension 31, as shown in FIGS. 6 and 7.

Referring to FIGS. 6 and 7, the lockring is shown as joining a pair of tube members 32 and 33, the tube member 33 having a bell extremity 34 into which the tube member 32 extends. In this arrangement the lockring 21 is forced over the open end of the bell. In FIG. 7 the lockring 21 has been forced over the flared end 35 of the bell.

While the lockring 21 is not limited to use on tube members of soft material such as soft aluminum, the lockring is particularly suited for such use.

Operation of the lockring when used in conjunction with the tube members 32 and 33 as shown in FIG. 6, 7 and 8 is as follows:

The cylindrical zone 23 of the lockring forms a sliding fit over the bell extremity 34 whether it be positioned over the open or the flared end 35. As the lockring is forced on, the first tapered zone 24 forces the bell enlargement into initmate contact with the tube 2 compensating for dimensional tolerance as indicated in FIG. 8. After initmate contact is made the tapered zone 24 effects an initial simultaneous constriction of the two tube members.

As no further constriction occurs in the second cylindrical zone 25 the force required is materially less than if the zone 25 were tapered. The friction force in the cylindrical zone may be minimized by a conventional high strength lubricant, such as graphite or a fluorcarbon, applied to the interior of the lockring or the outer bell extremity.

Added force is, however, required as the tapered zone 26 is moved onto the bell extremity; the amount of added force being predetermined by the axial length of tapered zone 26. Further constriction does not occur during movement of the third cylindrical zone onto the bell extremity.

Finally, maximum constriction occurs as the final tapered zone 28 is forced onto the bell extremity 34. As the shoulder 30 passes onto the bell extremity 34, the tube members undergo recovery of spring back in proportion to the resiliency of the material. This provides a strong locking force resisting removal of the lockring.

The series of tapered regions spaced by cylindrical zones not only reduces materially the force required to install the lockring, but also provide a spaced series of major sealing contacts as well as distributing any bending load that may be applied to the tube members. The long cylindrical contacting zones provide resistance to torque.

Because of the flared end 35, axial compression against the bell extremity exerts a radially outward force tending to buckle the bell extremity. This is minimized by the series arrangement of cylindrical and tapered zones permitting relatively thin walls. If extremely thin walls, or walls of soft material are required, the lockring may be applied at the flared end 35 as shown in FIG. 7, placing the bell extremity 34 under tension instead of compression.

While an integral belled tube extremity is shown, it should be noted that an outer sleeve or coupling may be substituted.

Figure 9:
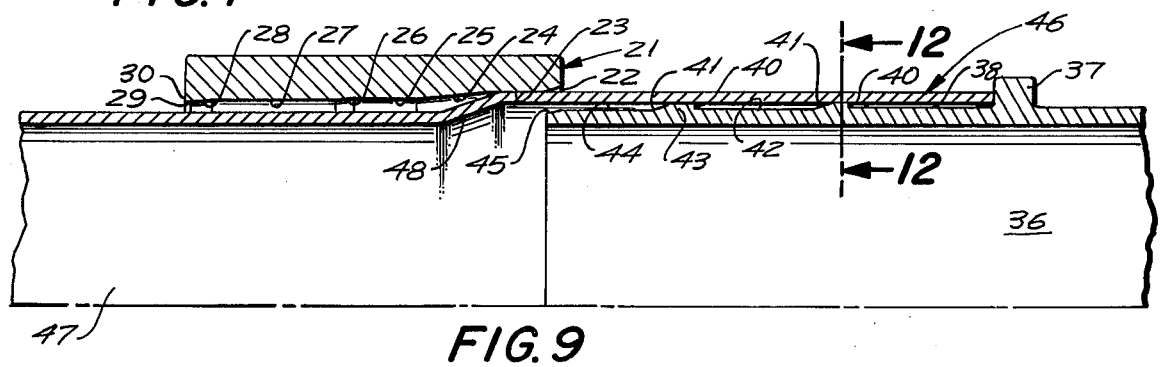
FIG. 9 is a fragmentary sectional view showing a further embodiment of the lockring tube joint wherein a pair of tube members have bell ends for assembly over an internal coupling tube member, the parts thereof being shown in position for assembly.
Figure 10:
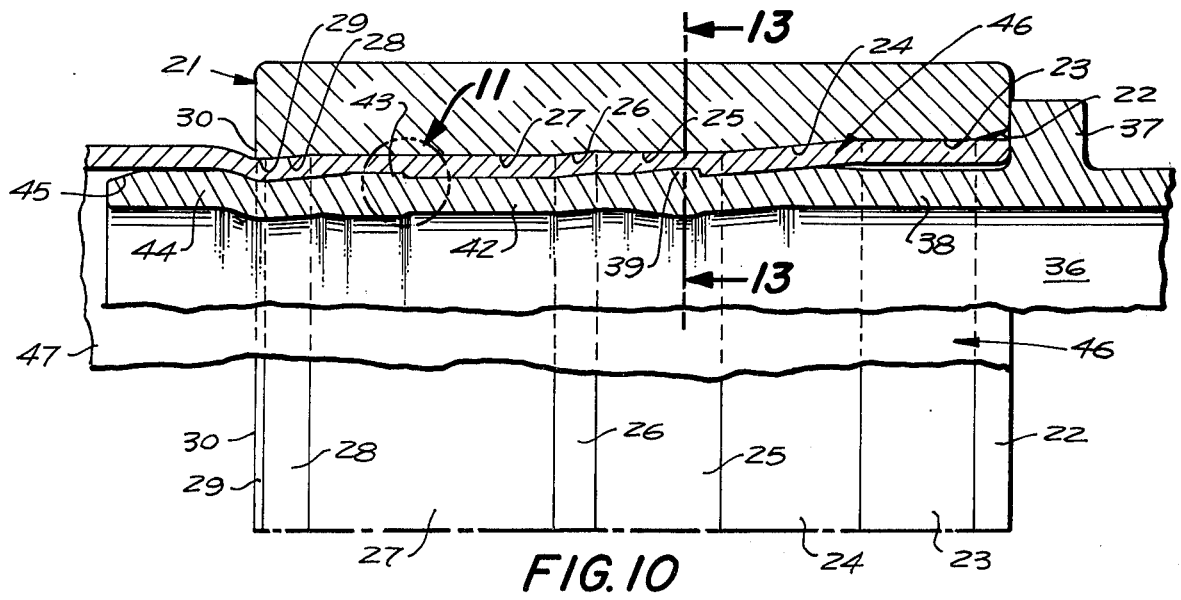
FIG. 10 is an enlarged fragmentary sectional view thereof showing the lockring tube joint in its assembled condition.

Referring to FIGS. 9, 10 and 11 the lockring tube joint here illustrated includes internal tube or collar 36 having an annular stop shoulder 37. Adjacent to the stop shoulder 37 the internal tube forms a first cylindrical portion 38 terminating at a first external annular compression flange 39 of low profile. The axially inner edge of the flange 39 forms an abrupt margin 40 and the axially outer edge of the flange forms a tapered margin 41.

The flange 39 is joined to a second cylindrical portion 42 of slightly smaller diameter than the first cylindrical portion 38. The second cylindrical portion 42 is joined to a second annular compression flange 43 also having an abrupt margin 40 and a tapered margin 41. The second flange 43 is joined to a third cylindrical portion 44 of slightly less diameter than the second cylindrical portion 42. The tube is provided with a beveled extremity 45.

The internal tube or collar 36 receives an external tube 46 which is actually the cylindrical bell end of continuing tube 47 joined to the tube 46 by a flared portion 48, the internal diameter of the external tube 46 is such as to be slidable over the first or larger external flange 39.

The lockring 21 as previously described completes the tube connection.

The lockring tube joint as shown in FIGS. 9, 10 and 11 is assembled as follows:

The internal tube 36 is inserted into the external tube 46 until the external tube 46 is abutting the stop shoulder 37. The lockring 21 is initially positioned on the continuing portion 47 beyond bell end 46 of the tube. The internal dimensions of the lockring are such that the first cylindrical portion 23 fits over the beveled portion 48 of the external tube or bell end 46. When the lockring is forced thereover the series of tapered and cylindrical zones function as described in regard to FIGS. 6, 7 and 8.

The first compression flange 39 is disposed within the boundries of the second cylindrical portion 25 of the lockring 21 when the leading end of the lockring is in abutment with the stop shoulder 37. The flange 39 causes further compression of the internal tube 36 at this region and the compression forces cause localized flow of the material comprising the external tube around the flange 39 to effect a strong interlocking and sealing connection therebetween. Similarly the third cylindrical portion 27 of the lockring 21 compresses the external tube 46 about the second flange 43 to form a second locking and sealing connection, an enlarged view thereof being shown in FIG. 11.

Finally as described in regard to FIGS. 6, 7 and 8, a third interlock is effected by the tapered portion 28 and the abrupt shoulder 30 formed at the trailing end of the lockring 21. The abrupt shoulder 30 becomes locked in place by reason of the fact that the internal tube 36 and external 46 are capable of limited springback when the constriction force of the lockring is removed.

It should be noted that, for purposes of illustration, the radial dimension of the comrpession flanges 39 and 43 have been exaggerated. Actually their radial dimension may be in the order of 0.012 inches (.3 mm).

The material or materials comprising the intrenal tube 36 and external tube 46 are preferably mallable with some resiliency for example, copper or aluminum as well as various alloys. The lockring 21 is formed of material which together with greater wall thickness makes it substantially stronger than the tubes 36 and 46 and may have greater resiliency for example, but not by way of limitation, the lockring 21 may be formed of steel or of higher strength alloys. In addition the wall thickness of the lockring 21 is substantially greater than the wall thickness of the tubes 36 and 46. As the wall thickness is increased the unit strength of the lockring 21 may be decreased. The strength of the lockring is further enhanced, at the high stress area of the shoulder 30, by the extension 31.

Figure 12:
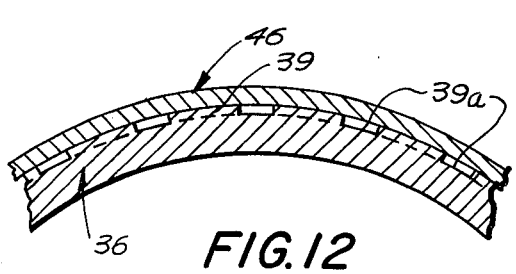
FIG. 12 is an enlarged fragmentary transverse sectional view taken through 12—12 of FIG. 9 wherein an interlocking rib is modified to provide axial channels to increase torsional interlock.
Figure 13:
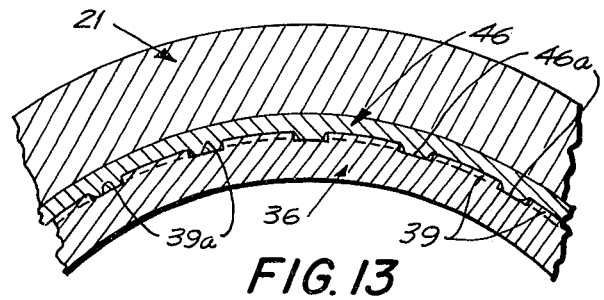
FIG. 13 is a fragmentary transverse sectional view taken through 13—13 of FIG. 10 wherein the modified rib is shown when effecting a torsional interlock.
Figure 14:
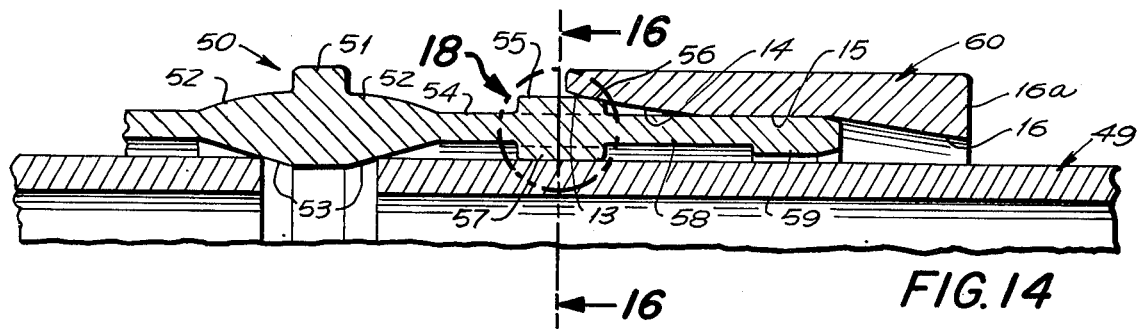
FIG. 14 is a fragmentary longitudinal sectional view of a further embodiment of the constrictor ring joint with the parts in their initial position.
Figure 15:
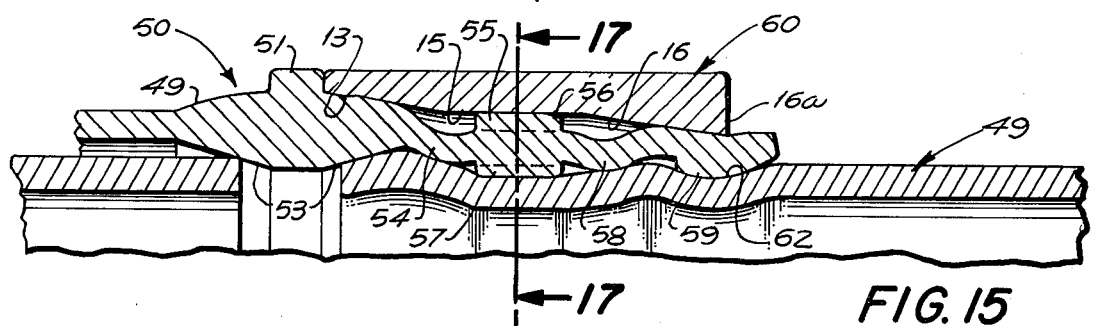
FIG. 15 is a fragmentary longitudinal sectional view thereof corresponding to FIG. 14, but showing the parts in their secured position.
Figure 16:
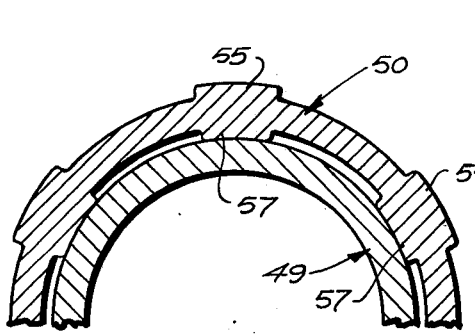
FIG. 16 is a fragmentary transverse sectional view thereof taken through 16—16 of FIG. 14.
Figure 17:
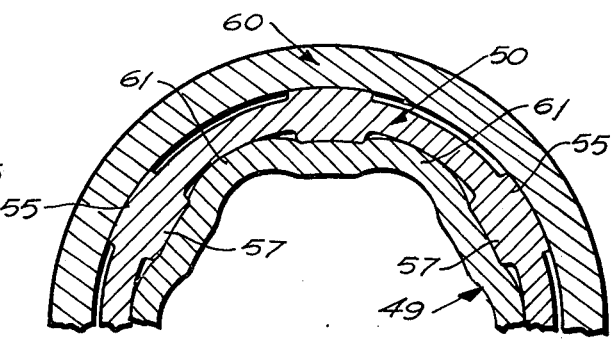
FIG. 17 is a transverse sectional view thereof taken through 17—17 of FIG. 15.
Figure 18:
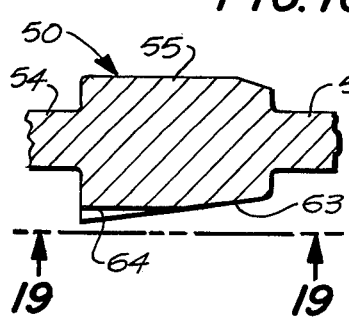
FIG. 18 is a fragmentary sectional view corresponding to the region within circle 18 of FIG. 14 illustrating a modification of the interlocking rib.
Figure 19:
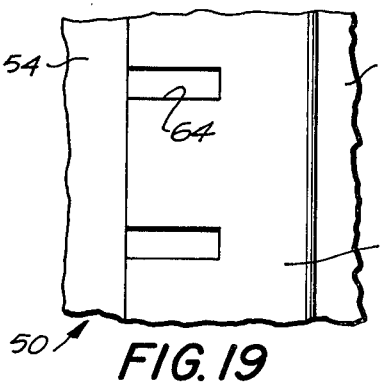
FIG. 19 is a fragmentary view of the internal surface thereof taken from 19—19 of FIG. 18.

Referring to FIGS. 12 and 13, should it be desirable to increase the resistance to torsional forces, the annular rib 39 or 49 may be provided with a ring of axially extending channels 39a (which may be only a few thousandths of an inch deep). When the lockring 21 is forced in place some material forming the outer tube 46 flows into the channels 39a as indicated by 46a in FIG. 13. The utilization of the tube joint to withstand torsional loads is further illustrated in FIGS. 14 through 21.

Referring to FIGS. 14 through 17, the construction illustrated includes an inner tube 49 of initially uniform dimension and an outer tube or union collar 50 having an external stop 51, an external tapered section 52 adjacent each side thereof and an internal tapered tapered section 53 underlying each external tapered section. Continuing form each tapered section is a portion 54 of reduced wall thickness which joins a portion having circumferentially separated external boss or rib segments 55 with bevelled leading surfaced 56 and circumferentially separated internal boss or rib segments 57. Beyond each pair of boss or rib segments 55 or 57 is a second portion 58 of reduced wall thickness which joins a final cylindrical portion having an internal land or rib 59.

The outer tube 50 receives a lockring 60 which may be essentiably the same as the lockring 12; that is, including a short cylindrical entrance end 13, an initial internally tapered region 14, an internal cylindrical section 15, and a final internally tapered region 16, terminating at an abrupt shoulder 16a.

Assembly of the tube joint as shown in FIG. 14 through 17 is as follows:

When the lockring 60 is forced over the outer tube 50, the first cone frustum bore 14 engages the external boss segments 55 pressing the internal boss segments 57 into the inner tube producing spaced depressions forming interlocking regions 61 which resist torsional loads as well as axial loads.

Simultaneously, the trailing shoulder 16a of the lockring 60 is forced over the portion of the outer tube having the internal land 59 causing the internal land 59 to press into the inner tube 49 and form a constricted sealing zone 62. Elastic spring back occurs in both the tubes so that the sealing zone defines an obtuse V shape.

Also, simultaneously, the initial or first conical bore 14 engages the external tapered portion 52 of the outer tube and also applies an axial compression force. The increasing assembly force may cause buckling of the portions of reduced wall thickness 54 and 58, which in turn causes the extremity of the inner tube 49 to wedge further against the internal tapered portion 53 to form a preloaded support area and a seal here in addition to the seal formed in the constricted sealing zone 62.

The leading extremity of the lockring 60 engages the stop 51 so as to position the cylindrical portion or bore 15 over the external boss segments 55 and to position the trailing shoulder 16 midway between the ends of the internal land 59. If desired, the stop 51 amy be omitted and the lockring may have a rearward cylindrical portion and internal stop flange.

Figure 20:
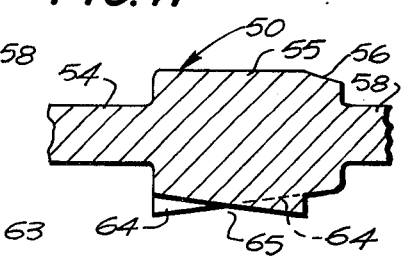
FIG. 20 is a fragmentary sectional view similar to FIG. 18, showing a further modification.

In the first embodiment shown in FIGS. 1 through 5, while the flange 8 of the outer tube 3 is indicated as continuous, it may be segmented, and conversely the boss segments of the embodiment shown in FIGS. 14 through 17 may be continuous or ribs, also both features may be incorporated in one flange configuration. More particularly, referring to FIGS. 18 and 19, in place of the internal boss segment 59, an internal annular rib 63 may be provided having an internally sloping surface, a portion of which is provided with a series of slots 64. When a constrictor joint provided with a rib 63 is secured, the inner tube locks into the slots 64, however the adjacent portion of the inner tube provides a sealing connection with the smooth portion of the rib 63. Referring to FIG. 20, a similar result may be obtained by providing a stepped portion which is slotted in opposite directions.

While the members 1, 32, 36 and 49 have been indicated as tubes, each may be a solid shaft or mandrel. In this case, the depth of the constricted zones are minimal; however the radial compression of the corresponding outer tubes may readily be such as to obtain an interference fit or mechanical interlock sufficiently strong as to be suitable, for example, to secure a gear on a shaft, the gear having one or two side extensions, each comparable to a section of the outer tube.

Having fully described my invention it is to be understood that I am not to be limited to the details herein set forth, but that my invention is of the full scope of the appended claims.

I claim:
1. A lockring tube joint, comprising:
   a. a lockring having internally at least a larger and a smaller tapered zone and a cylindrical zone disposed between and joining the smaller end of the larger tapered zone and the larger end of the smaller tapered zone, whereby the lockring has internally a larger end and a smaller end, the zones being of approximately equal axial length;
   b. an outer tube member having peripherally distributed projection means of less axial extent than each of said zones, the effective diameter of which approximates the internal diameter of the larger end of the lockring;
   c. an inner member initially slidable within the outer tube member;
   d. said lockring adapted to be forced axially on the outer tube member, the larger tapered zone, on initial movement, causing the lockring to effect radially inward deflection of the projection means and the underlying portion of the outer tube member to effect interlocking engagement between the outer and inner members;
   e. said lockring, on further movement, causing the cylindrical zone to slide on the projection means while maintaining said interlocking engagement;
   f. said lockring, on continued movement, causing the smaller tapered zone to constrict an axial end of the outer tubular member to effect a second interlocking engagement between the outer and inner members;
   g. the axial force to effect movement of the lockring and cause said second interlocking engagement between said inner and outer members being confined essentially to the constricting force applied to the axial end of the outer member and the frictional force between the cylindrical zone and the projection means.

2. A lockring joint, as defined in claim 1, wherein:
   a. the smaller end of the smaller tapered zone terminates in an abrupt shoulder permitting springback of at least one of the tubular members in the region beyond the smaller tapered zone.

3. A lockring tube joint, as defined in claim 1, wherein:
   a. the smaller end of the smaller tapered zone occupies a final position axially spaced from the end of the outer tube member to permit resilient springback of the outer and inner members.

4. A lockring joint, as defined in claim 1, wherein:
   a. the projection means is an annular flange.

5. A lockring joint, as defined in claim 1, wherein:
   a. the projection means is a series of peripherally spaced coplanar projections.

6. A lockring joint, comprising:
   a. a lockring having, internally, a cone frustum zone and a cylindrical zone extending axially from the smaller end of the frustum zone;
   b. a tubular member having circumferentially distributed radial projection means of lesser axial extent than the cone frustum zone and spaced from an axial end of the tubular member a distance approximating the axial length of the cone frustum zone;
   c. the lockring and tubular member dimensioned to be preassembled with said projection means received in the larger end of the cone frustum zone, and said axial end of the tubular member received in the cylindrical zone adjacent the smaller end of the cone frustum zone whereby the lockring is stabilized in coaxial relation to the tubular member;
   d. and an inner member dimensioned to be slidably received within the tubular member;
   e. said lockring adapted to be forced axially from its preassembled position to cause the cone frustum zone to effect a predetermined radially inward deflection of the projection means and corresponding localized deflection of the tubular member to form an interlocking connection between the tubular member and inner member, the cylindrical zone receiving the inwardly deflected projection means on final axial movement of the lockring thereby to maintain the interlocking connection between the tubular member and the inner member;
   f. a second cone frustum zone having a larger end corresponding in diameter to the cylindrical zone and continuing from the end thereof remote from the first cone frustum zone and terminating in a smaller end;
   g. the second cone frustum zone being movable over the tubular member toward the constricted projection means, as the projection means is maintained in its constricted state by the cylindrical zone, to effect a second constriction of the tubular member and form a second interlocking connection between the tubular member and the inner member, the smaller end of the second cone frustum zone being movable past the axial end of the tubular member to form a projecting portion free of the lockring to permit elastic expansion of the projecting portion thereby to secure the lockring against removal.

7. A lockring joint, as defined in claim 6, wherein:
a. the projection means is a continuous circumferential flange of uniform radius, whereby uniform force is applied to the inner member to effect a seal as well as an interlocking connection between the tubular member and inner member.

8. A lockring joint, as defined in claim 6, wherein:
a. the projection means is interrupted to apply peripherally spaced regions of interlocking connections between the tubular member and inner member thereby to increase resistance to torsional forces.

9. A lockring joint, as defined in claim 6, wherein:
a. the inner member is a solid member.

10. A lockring joint, as defined in claim 6, wherein:
a. the inner member is tubular.

11. A lockring joint, as defined in claim 6, wherein:
a. the projection means and the second cone frustum zone are peripherally continuous and of uniform dimension whereby each interlocking connection is also a seal connection.

12. A lockring joint, as defined in claim 6, wherein:
a. the projection means is interrupted to form circumferentially spaced regions of increased interlocking connection having increased resistance to torsional forces;
b. and the second cone frustum zone and the portion of the tubular member are of uniform radial dimension whereby the second interlocking connection is also a seal connection.

* * * * *